United States Patent
Draaijer et al.

(10) Patent No.: US 10,935,666 B2
(45) Date of Patent: Mar. 2, 2021

(54) POSITIONING SYSTEM AND METHOD FOR POSITIONING

(71) Applicant: SIGNIFY HOLDING B.V., Eindhoven (NL)

(72) Inventors: Maurice Herman Johan Draaijer, Ittervoort (NL); Paulus Henricus Antonius Damink, Son en Breugel (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 193 days.

(21) Appl. No.: 15/730,144

(22) Filed: Oct. 11, 2017

(65) Prior Publication Data

US 2018/0100932 A1    Apr. 12, 2018

(30) Foreign Application Priority Data

Oct. 11, 2016 (EP) ..................................... 16193278

(51) Int. Cl.
*G01S 19/42* (2010.01)
*G01S 5/02* (2010.01)
(Continued)

(52) U.S. Cl.
CPC ............ *G01S 19/42* (2013.01); *G01S 5/0252* (2013.01); *G01S 19/14* (2013.01); *G01S 19/24* (2013.01);
(Continued)

(58) Field of Classification Search
CPC .......... G01S 19/01; G01S 19/02; G01S 19/09; G01S 19/14; G01S 19/24; G01S 19/28;
(Continued)

(56) References Cited

U.S. PATENT DOCUMENTS

2003/0142036 A1 * 7/2003 Wilhelm .................. H01Q 1/36
343/909
2006/0125684 A1    6/2006 Leinonen et al.
(Continued)

FOREIGN PATENT DOCUMENTS

EP    1881336 A1 *  1/2008    ............. G01S 19/22
EP    1881336 A1     1/2008
(Continued)

OTHER PUBLICATIONS

Liang Heng, et al., "GNSS Multipath and Jamming Mitigation Using High-Mask-Angle Antennas and Multiple Constellations," IEEE Transactions on Intelligent Transportation Systems, vol. 16, No. 2, Apr. 2015 (10 Pages).

*Primary Examiner* — Erin F Heard
*Assistant Examiner* — Michael W Justice
(74) *Attorney, Agent, or Firm* — Meenakshy Chakravorty

(57) ABSTRACT

There is provided a positioning system that comprises a GPS device including a GPS receiver arranged to receive GPS satellite signals from a plurality of GPS satellites and an attenuation device arranged to attenuate GPS satellite signals such that when a GPS satellite is located in a first portion of sky the GPS satellite signals received by the GPS receiver from said GPS satellite are attenuated. A storage is provided to store satellite location information for the plurality of GPS satellites over time at a location of the GPS receiver, and a controller is provided to determine location information of the GPS device based on received GPS information from the GPS device, wherein the received GPS information comprises information on signal strengths of the GPS satellite signals received by the GPS receiver. If a signal strength for a first GPS satellite is lower than a threshold signal strength at a point in time then the controller is arranged to determine that the first GPS satellite is in the first portion of the sky and determine angle information of (Continued)

the GPS device relative to earth's normal and/or orientation information of the GPS device in a horizontal plane using the stored satellite location information.

15 Claims, 14 Drawing Sheets

(51) Int. Cl.
G01S 19/14 (2010.01)
G01S 19/24 (2010.01)
F21W 131/10 (2006.01)

(52) U.S. Cl.
CPC ........ *G01S 19/426* (2013.01); *F21W 2131/10* (2013.01)

(58) Field of Classification Search
CPC ........ G01S 19/34; G01S 19/42; G01S 19/426; G01S 5/0252; F21W 2131/10; H01Q 15/002; H01Q 15/0026; H01Q 15/0053; H01Q 15/006; H01Q 15/14; H01Q 15/23
USPC .................................................. 342/1–4, 70
See application file for complete search history.

(56) References Cited

U.S. PATENT DOCUMENTS

| | | | |
|---|---|---|---|
| 2009/0034258 A1* | 2/2009 | Tsai | H05B 47/10 362/253 |
| 2012/0059578 A1* | 3/2012 | Venkatraman | G01C 21/20 701/411 |
| 2014/0249771 A1* | 9/2014 | Yang | G01C 21/206 702/150 |
| 2015/0347351 A1* | 12/2015 | Kazemi | H04W 4/025 702/180 |
| 2017/0003395 A1* | 1/2017 | Sasaki | G01S 19/428 |

FOREIGN PATENT DOCUMENTS

| | | | | |
|---|---|---|---|---|
| EP | 2037290 A1 * | 3/2009 | ........... | G01S 21/206 |
| EP | 2560024 A2 | 2/2013 | | |
| EP | 1729145 B1 | 8/2013 | | |
| WO | 2016050258 A1 | 4/2016 | | |

* cited by examiner

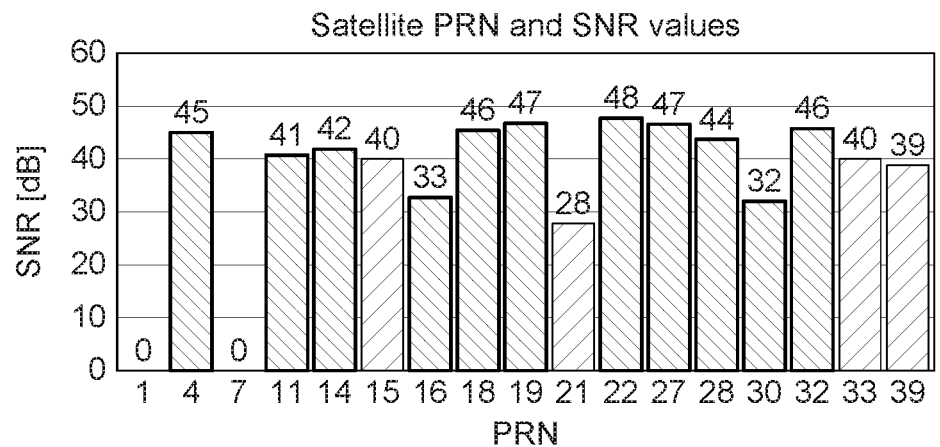
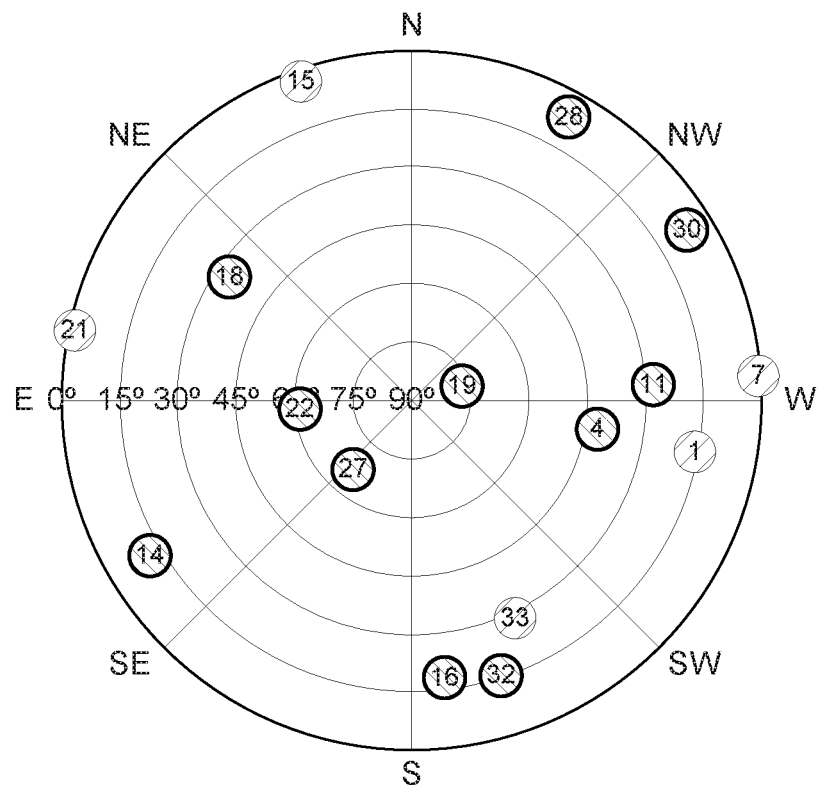
FIG. 3A

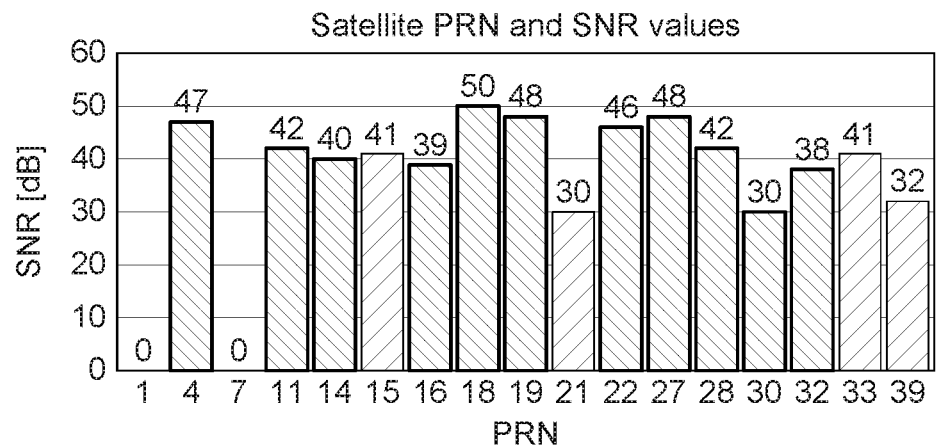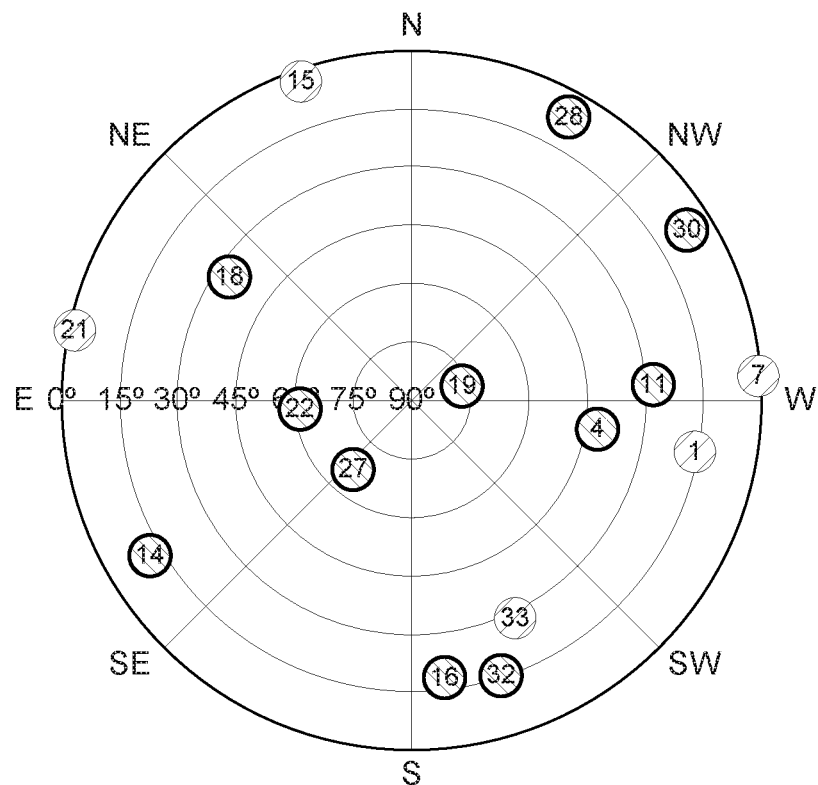
FIG. 3B

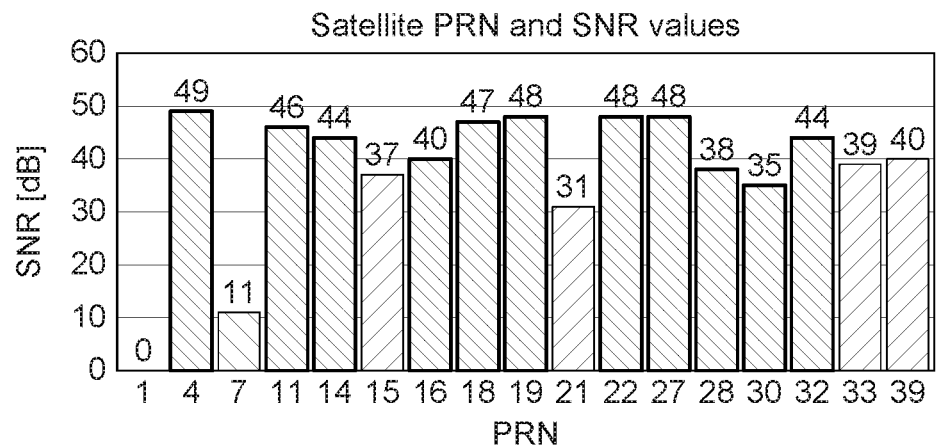
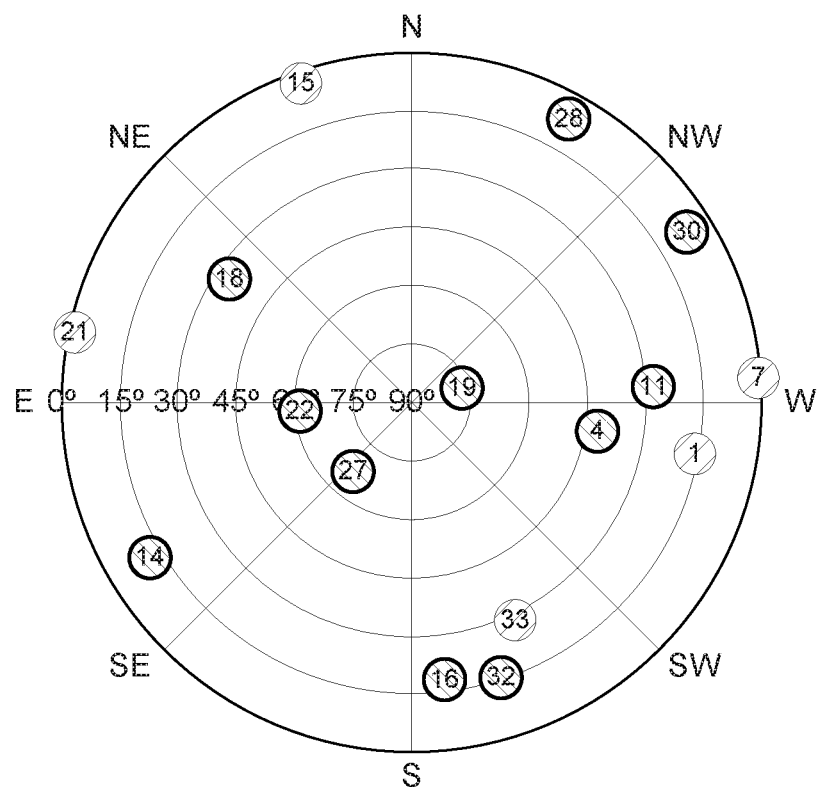
FIG. 3C

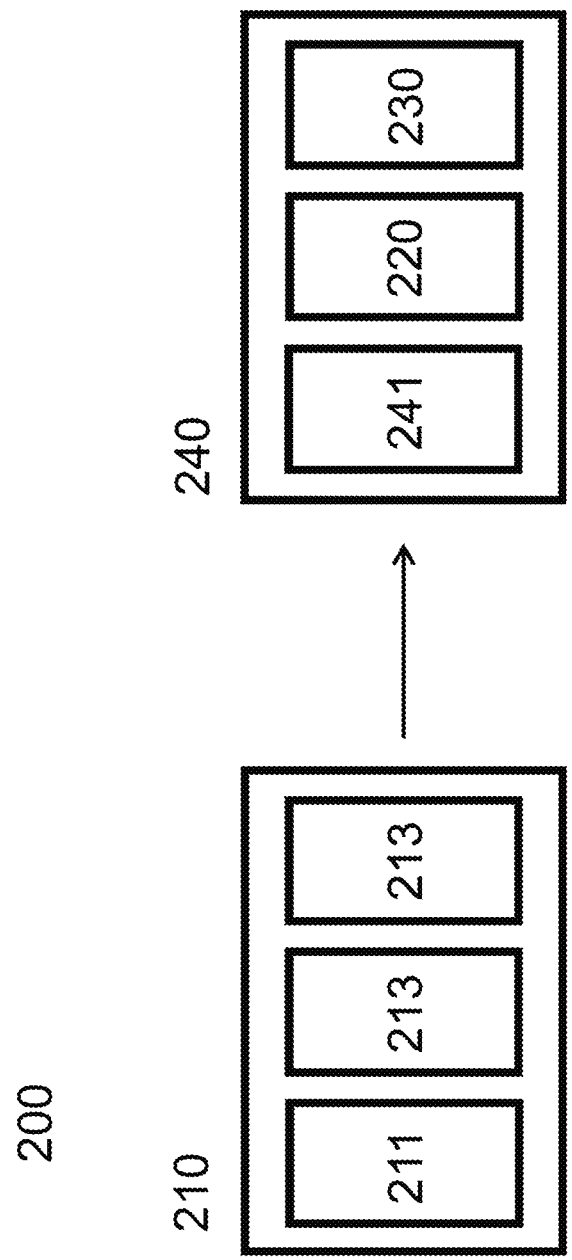

POSITIONING SYSTEM AND METHOD FOR POSITIONING

FIELD OF THE INVENTION

The invention relates to a positioning system and a method for positioning. The present invention also relates to a device (e.g. an outdoor lighting system or a portable device) using such a positioning system.

BACKGROUND OF THE INVENTION

Conventional GPS systems are used in a wide variety of applications. Such conventional systems include a GPS receiver that is able to receive GPS satellite signals from GPS satellites in the sky. The satellites carry stable atomic clocks that are synchronized to each other and to ground clocks, and drift from true time maintained on the ground is corrected daily. Likewise, the satellite locations are known with precision.

A GPS receiver can receive GPS signals from multiple satellites and can determine its position and its deviation from true time. At a minimum, four satellites must be in view of the receiver for it to compute four unknown quantities (three position coordinates and clock deviation from satellite time). However, the position accuracy of conventional GPS systems is limited to a few meters.

SUMMARY OF THE INVENTION

It is an object of the invention to provide a positioning system and method of positioning that overcomes problems associated with conventional systems.

According to an aspect of the present invention, there is provided a positioning system comprising: a GPS device including a GPS receiver arranged to receive GPS satellite signals from a plurality of GPS satellites and an attenuation device arranged to attenuate GPS satellite signals such that when a GPS satellite is located in a first portion of sky the GPS satellite signals received by the GPS receiver from said GPS satellite are attenuated; and a controller arranged to determine position information of the GPS device based on received GPS information from the GPS device.

According to an aspect of the invention, there is provided a positioning system comprising: a GPS device including a GPS receiver arranged to receive GPS satellite signals from a plurality of GPS satellites and an attenuation device arranged to attenuate GPS satellite signals such that when a GPS satellite is located in a first portion of sky the GPS satellite signals received by the GPS receiver from said GPS satellite are attenuated; a storage arranged to store satellite location information for the plurality of GPS satellites over time at a location of the GPS receiver; and a controller arranged to determine location information of the GPS device based on received GPS information from the GPS device, wherein the received GPS information comprises information on signal strengths of the GPS satellite signals received by the GPS receiver, wherein if a signal strength for a first GPS satellite is lower than a threshold signal strength at a point in time then the controller is arranged to determine that the first GPS satellite is in the first portion of the sky and determine angle information of the GPS device relative to earth's normal and/or orientation information of the GPS device in a horizontal plane using the stored satellite location information.

Hence, the antenna radiation pattern can be made asymmetric by covering only a particular area of the sky so that incoming signals through that area are attenuated or blocked. By rendering the antenna radiation pattern asymmetric, the signal-to-noise ratio of the signals received from some of the satellite(s) is affected without influencing the azimuth or angle data. It will be appreciated that at a first glance, it might seem counterintuitive, that embodiments of the invention make some signals worse on purpose enabling embodiments of the invention to have more information (e.g. addition positing data or information like orientation and angle).

The attenuation device may arranged to attenuate GPS satellite signals by blocking GPS satellite signals from GPS satellites located in the first portion of the sky from being received by the GPS receiver. In such embodiments, the attenuation device may be made from a suitable GPS blocking material or from a conductive material.

The attenuation device may comprise a portion of GPS satellite signal attenuating material located between the GPS receiver and the sky.

The attenuation device may comprise a portion of GPS satellite signal reflecting material located close and at the opposite side of the satellite(s) seen from the GPS receiver, mostly under the GPS receiver.

The attenuation device may be fixed in position relative to the GPS receiver.

In some embodiments, the satellite location information comprises reference angle information, reference azimuth information, and reference signal strength for the plurality of GPS satellites over time at the location of the GPS receiver, wherein the reference angle information, reference azimuth information, and the reference signal strength correspond to GPS satellite signals from the plurality of GPS satellites unattenuated by the attenuation device; wherein the controller is arranged to receive angle information, azimuth information, and signal strength for each of the plurality of GPS satellites from the GPS receiver; wherein the controller is arranged to compare the received signal strength with the reference signal strength for each of the plurality of GPS satellites; and wherein if the received signal strength for a first GPS satellite is lower than the reference signal strength for the first GPS satellite, then the controller is arranged to determine that the first GPS satellite is in the first portion of the sky and determine the angle information of the GPS device relative to earth's normal and/or the orientation information of the GPS device in a horizontal plane using the reference angle information and reference azimuth information. Such a GPS device can therefore provide orientation and angle information with separate sensors, and without needing calibration.

The controller may be arranged to determine a change in the angle of the GPS device relative to earth's normal and/or a change in the orientation of the GPS device in a horizontal plane based on change in the determined angle information and/or orientation information.

The controller may be arranged to determine a time of day when received GPS satellite signals from a GPS satellite become attenuated as a result of said GPS satellite passing through the first portion of the sky; wherein the controller is arranged to determine a change in orientation of the GPS device based on a change in the time of day when the received GPS satellite signals from said GPS satellite become attenuated.

The attenuation device may have a first state in which the attenuation device does not attenuate GPS satellite signals, and a second state in which the attenuation device attenuates GPS satellite signals from the first portion of the sky.

The attenuation device may comprises a first gauze, a second gauze on top of the first gauze, wherein the first gauze and the second gauze are not electrically connected in the first state, and wherein the first gauze and the second gauze are electrically connect the first gauze and the second gauze in the second state.

The attenuation device may comprise at least one switch diode connected between the first gauze and the second gauze, wherein the at least one switch diode is arranged to electrically connect the first gauze and the second gauze in the second state.

The positioning system may further comprise a second GPS device including a GPS receiver arranged to receive GPS satellite signals from a plurality of GPS satellites. The controller may be arranged to determine position information of the second GPS device based on received GPS information from the second GPS device. If the GPS device and the second GPS device are close, the controller may be arranged to distinguish the location of the GPS device from the location of the second GPS device on the basis of a difference in received GPS signals from the GPS device and the second GPS device. For example, a difference in SNR for a particular satellite measured at the second GPS device when compared to the GPS device would enable the GPS signals from the GPS device to be differentiated from the second GPS device. In other words, such embodiments enable a controller to identify two GPS devices in close proximity.

According to another aspect, there may be provided a mobile device comprising: a positioning system according to any of the above aspects; wherein the controller is arranged to determine angle information of the GPS device relative to earth's normal and/or orientation information of the GPS device in a horizontal plane based on the received GPS information from the GPS device.

According to another aspect, there may be provided an outdoor lighting system comprising: a positioning system according to any of the above aspects; an outdoor lighting apparatus comprising a lighting unit including the GPS device and one or more lights; wherein the controller is arranged to determine location information of the lighting unit based on the received GPS information from the GPS device.

The outdoor lighting apparatus may comprise a pole on which the lighting unit is mounted.

The outdoor lighting apparatus may further comprise a second lighting unit including a second GPS device and one or more second lights; wherein the second GPS device includes a second GPS receiver arranged to receive GPS satellite signals from the plurality of GPS satellites; wherein the controller is arranged to determine position information of the second lighting unit based on received GPS information from the second GPS device.

The second lighting unit may be on the same pole as the first lighting unit.

The second GPS device may include a second attenuation device arranged to attenuate GPS satellite signals such that when a GPS satellite is located in a second portion of the sky the GPS satellite signals received by the second GPS receiver for said GPS satellite are attenuated.

The outdoor lighting system may further comprise: a second outdoor lighting apparatus comprising a third lighting unit including a third GPS device and one or more third lights; wherein the controller is arranged to determine position information of the third lighting unit based on received GPS information from the third GPS device.

The third GPS device may further include a third attenuation device arranged to attenuate GPS satellite signals such that when a GPS satellite is located in a third portion of the sky the GPS satellite signals received by the third GPS receiver for said GPS satellite are attenuated.

The second outdoor light apparatus may comprise a second pole on which the third lighting unit is mounted. In such embodiments, the location of the first outdoor light apparatus may be distinguished from the location of the second outdoor light apparatus on the basis of a difference in received GPS signals from the first outdoor light apparatus and the second outdoor light apparatus. For example, a difference in SNR for a particular satellite measured at the second outdoor light apparatus when compared to the first outdoor light apparatus would enable the GPS signals from the first outdoor light apparatus to be differentiated from the second outdoor light apparatus. Hence, the first outdoor light apparatus and the second outdoor light apparatus could be individually identified by the controller, even if their GPS receivers were close enough that a conventional GPS location reading would give the same result. In other words, such embodiments enable a controller to identify two outdoor light apparatuses on the same pole using only the GPS receivers.

The outdoor lighting system may comprise a plurality of outdoor light apparatuses, each with a lighting unit including a GPS device and one or more lights. The outdoor lighting system may identify each lighting unit on the basis of the location of its GPS device.

According to an aspect of the present invention, there is provided a positioning system comprising: a GPS device including a GPS receiver arranged to receive GPS satellite signals from a plurality of GPS satellites in order to determine location information of the GPS device, the received GPS satellite signals including angle information, azimuth information, and signal strength for the plurality of GPS satellites, and an attenuation device fixed relative to the GPS receiver arranged to attenuate GPS satellite signals received by the GPS receiver from a first portion of the sky; a storage arranged to store reference angle information, reference azimuth information, and reference signal strength for the plurality of GPS satellites at the location of the GPS receiver; a controller arranged to compare the received signal strength with the reference signal strength for each of the plurality of GPS satellites; wherein if the received signal strength for a first GPS satellite is lower than the reference signal strength, then the controller is arranged to determine that the first GPS satellite is in the first portion of the sky and determine an angle of the GPS device relative to earth's normal and an orientation of the GPS device in a horizontal plane based on the reference angle information and reference azimuth information.

According to an aspect of the present invention, there is provided a positioning system comprising: a GPS device including a GPS receiver arranged to receive GPS satellite signals from a plurality of GPS satellites in order to determine location information of the GPS device, and an attenuation device arranged to attenuate GPS satellite signals received by the GPS receiver from a first portion of the sky; a controller is arranged to determine a time of day when received GPS satellite signals from a first GPS satellite become attenuated as a result of the first GPS satellite passing through the first portion of the sky; wherein the controller is arranged to determine a change in orientation of the GPS device based on a change in the time of day when the received GPS satellite signals from said GPS satellite become attenuated.

According to an aspect of the present invention, there is provided a computer-implemented method of positioning system comprising: using a GPS device including a GPS receiver to receive GPS satellite signals from a plurality of GPS satellites, and using an attenuation device to attenuate GPS satellite signals such that when a GPS satellite is located in a first portion of sky the GPS satellite signals received by the GPS receiver from said GPS satellite are attenuated; and determining position information of the GPS device based on received GPS information from the GPS device.

According to an aspect of the invention, there is provided a computer readable medium carrying computer readable code for controlling a computer to carry out the method of any one of the above aspects.

According to an aspect of the invention, there is a computer readable medium carrying computer readable code for controlling a computer to carry out the method of any one of the above aspects.

BRIEF DESCRIPTION OF THE DRAWINGS

Embodiments of the invention will now be described, by way of example only, with reference to the accompanying drawings, in which:

FIGS. 3A, 3B and 3C show three plots of satellite signals as a function of signal-to-noise ratio (SNR) as received by three conventional GPS receivers at different physical orientations but at the same location;

FIG. 5 is a schematic view of a positioning system according to an exemplary embodiment of the present invention;

DETAILED DESCRIPTION OF THE EMBODIMENTS

Figure 1:
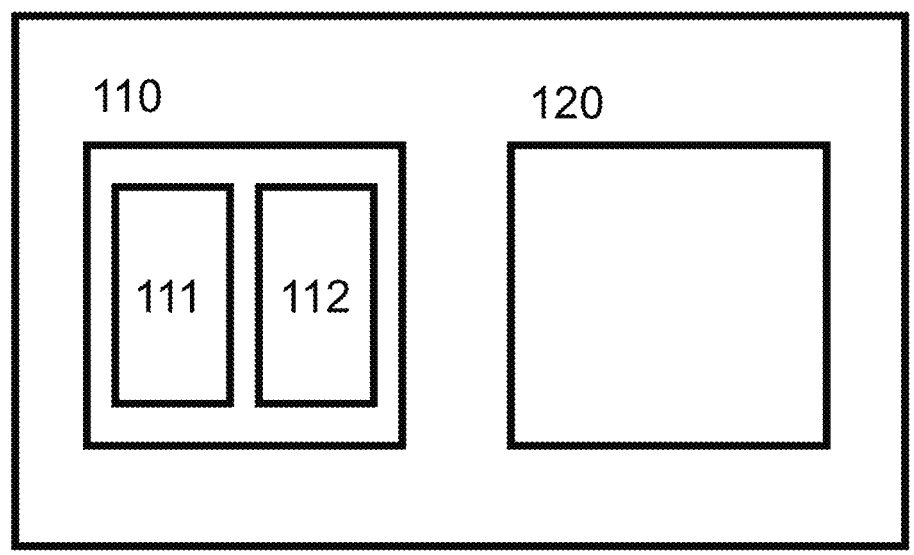
FIG. 1 is a schematic view of a positioning system according to an exemplary embodiment of the present invention.
Figure 2A:
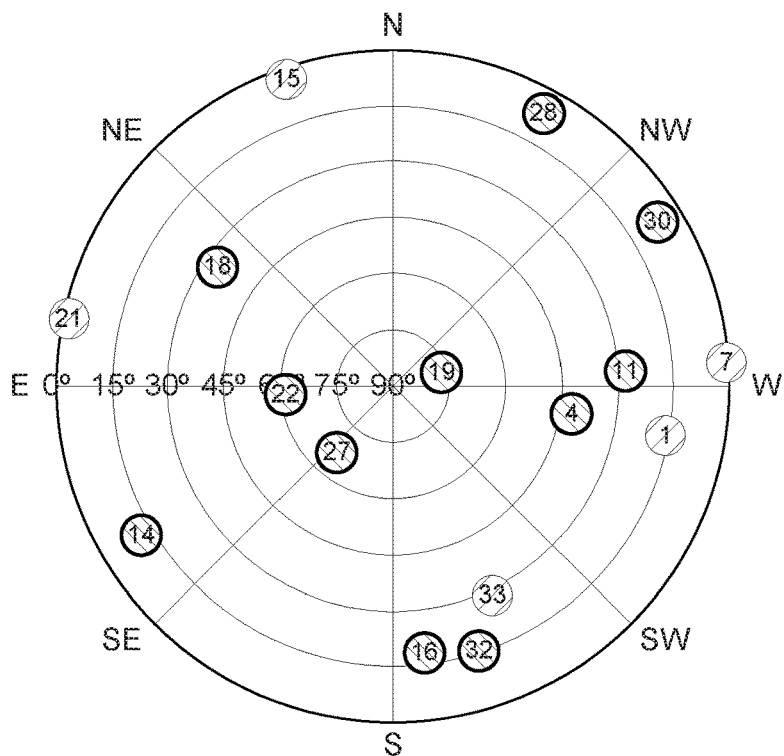
FIGS. 2A, 2B, 2C and 2D illustrate exemplary views of satellite constellations as determined by the same conventional GPS receiver at the same location at different times.
Figure 2B:
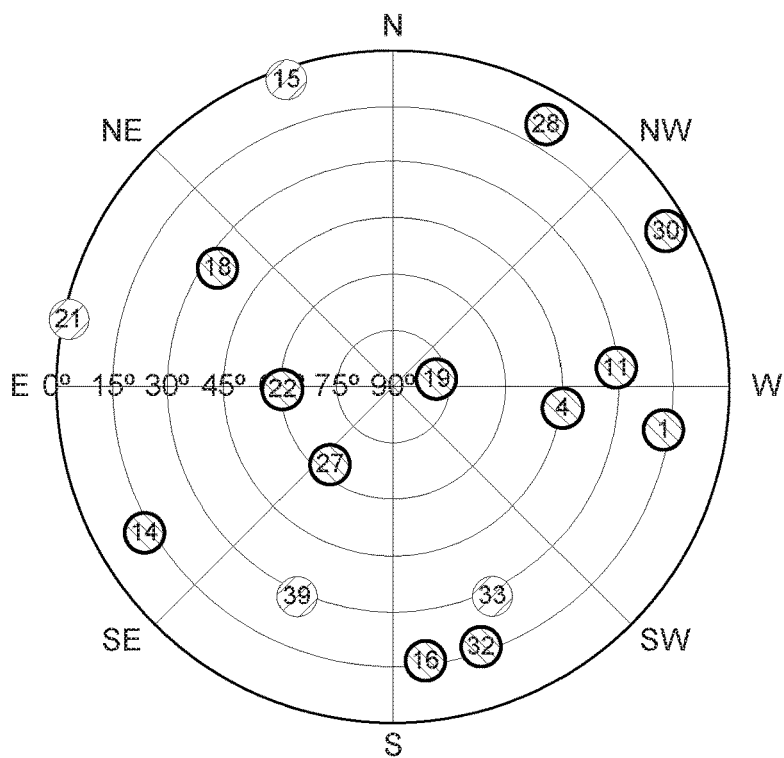
Figure 2C:
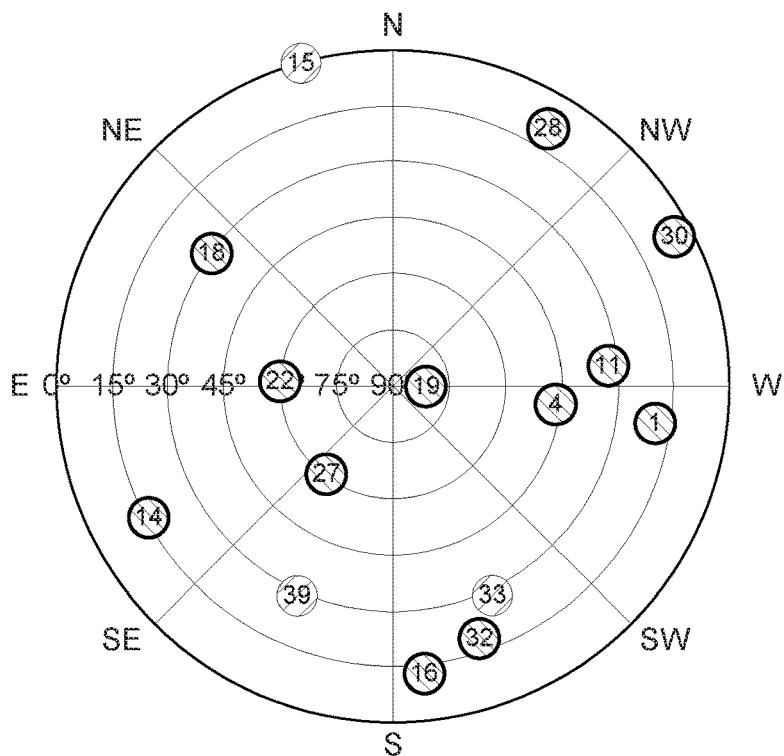
Figure 2D:
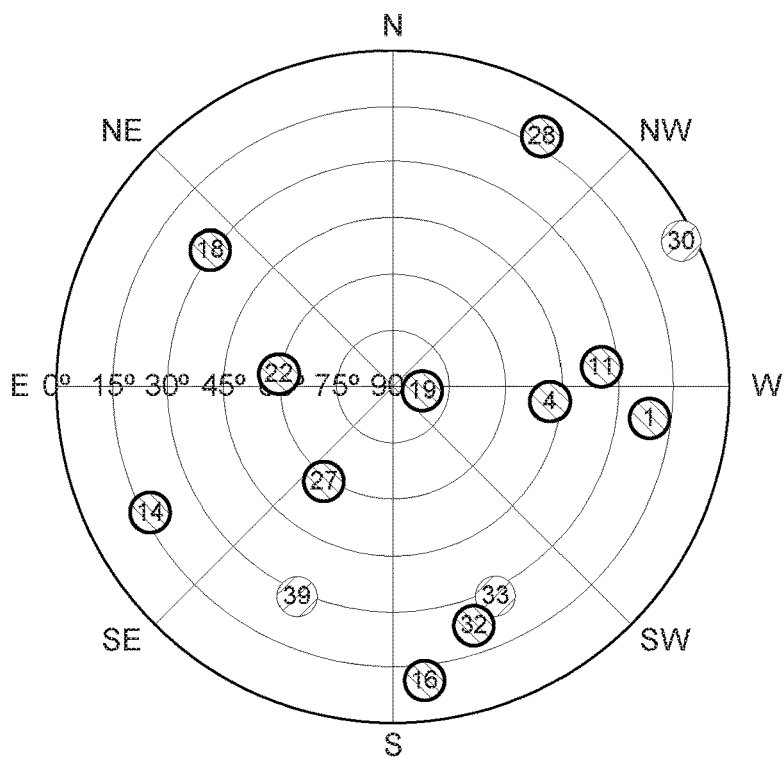

FIG. 1 shows a positioning system 100 comprising a GPS device 110 and a controller 120.

The GPS device 110 includes a GPS receiver 111 that is arranged to receive GPS satellite signals from a plurality of GPS satellites and an attenuation device 112. As will be explained in more detail below, the attenuation device 112 is arranged to attenuate GPS satellite signals. The attenuation device 112 is arranged such that when a particular GPS satellite is located in a particular portion of sky the GPS satellite signals received by the GPS receiver from that particular GPS satellite are attenuated (i.e. reduced or blocked).

The controller 120 receives GPS information from the GPS device 110. The controller 120 is arranged to determine position information of the GPS device 110 based on received GPS information from the GPS device 110. In FIG. 1, the GPS device 110 and the controller 120 are shown as being part of the same device. However, in other embodiments the GPS device 110 and the controller 120 could be in separate devices with a suitable communications mechanism being used to connect them. For example, the GPS device 110 and the controller 120 may be connected via an appropriate network such as the internet.

FIGS. 2A, 2B, 2C and 2D illustrate exemplary views of satellite constellations as determined by the same conventional GPS receiver at the same location at different times. So called $GPGSV data as part of the NMEA protocol can be plotted in terms of angle and azimuth to produce the graphs in FIGS. 2A-D. The GPS receiver receives all the signals from the available satellites simultaneously with the same antenna (not shown).

At a certain moment in time the satellites are in a specific position. The signal strength per satellite is determined by the GPS receiver. Every numbered dot (referred to as the PRN) in FIGS. 2A, 2B, 2C and 2D represents a particular satellite in the sky above the GPS receiver 111, and each satellite is located at a slightly different position in each plot. This is because each plot represents the orientations of the satellites at different points in time and the satellites are moving.

In general, in order for the angle and azimuth information of the satellite to be obtained, the signal at a GPS receiver received from a satellite should be strong enough to yield a signal-to-noise ratio (SNR) in a detectable range. In principle, the signals from each satellite should be largely identical in strength. However, in reality this can be affected by various factors.

A "symmetric" antenna radiation pattern refers to a situation where the strength of the signal received by the antenna is uniform regardless of the direction from which the signal is received, within the viewing range the antenna. In other words, the signal strength will not change even if the orientation of the antenna in the GPS receiver changes, as long as the satellite of interest is within the viewing range. When the antenna radiation pattern is "asymmetric", the angular position of a satellite with respect to the specific antenna radiation pattern of the GPS receiver will influence the signal strength. In other words, in the "asymmetric" case at a given point in time, the strength of the signal received from each satellite will depend on the orientation of the GPS receiver relative to the angular position of a particular satellite defined by azimuth and angle.

FIGS. 3A, 3B and 3C show three plots of satellite signals as a function of signal-to-noise ratio (SNR) as received by three conventional GPS receivers with attached their three antennas, all of the same brand and type (i.e. without any deliberate attenuation), at different physical orientations but as close as possible to each other which means only a few cm apart. The three plots show that the strength of the signal from each satellite is different, but that the plots for each of the three different conventional GPS receivers are similar. In other words, the relative strength of the signals and the azimuth and angle reading of the satellites are very similar for all three conventional GPS receivers. Hence, it can be inferred from the graphs that the antenna radiation patterns of the conventional GPS receivers are largely symmetric.

In the embodiment of FIG. 1, the attenuation device 112 is arranged such that when a particular GPS satellite is located in a particular portion of sky the GPS satellite signals received by the GPS receiver 111 from that particular GPS satellite are attenuated (i.e. reduced or blocked). In other words, the attenuation device 112 changes the antenna radiation pattern of the GPS receiver 111 so as to introduce deliberate asymmetry.

As is well known, for a 3-D position reading, the GPS receiver 111 requires signals from at least four of the satellites. Signals from more satellites can be used to increase accuracy. However, to obtain position reading with an acceptable accuracy does not require all the satellite signals in reception. By deliberately attenuating or blocking some signals received from some of the satellites, information on the orientation of a GPS receiver 111 can be obtained.

The attenuation device 120 on the GPS receiver 111 establishes an asymmetric antenna pattern for the GPS receiver 111. This influences the signal-to-noise ratio of the received satellite signals, but does not influence the azimuth or angle data of the satellite signals, as long as the signal remains detectable. When the signal from a particular satellite is blocked or attenuated to the extent that the signal-to-noise ratio is not sufficient to measure the position, azimuth and angle data for the current position of the particular satellite are restored from the known orbit data of the particular satellite. This will be explained with reference to FIG. 4.

Figure 4:
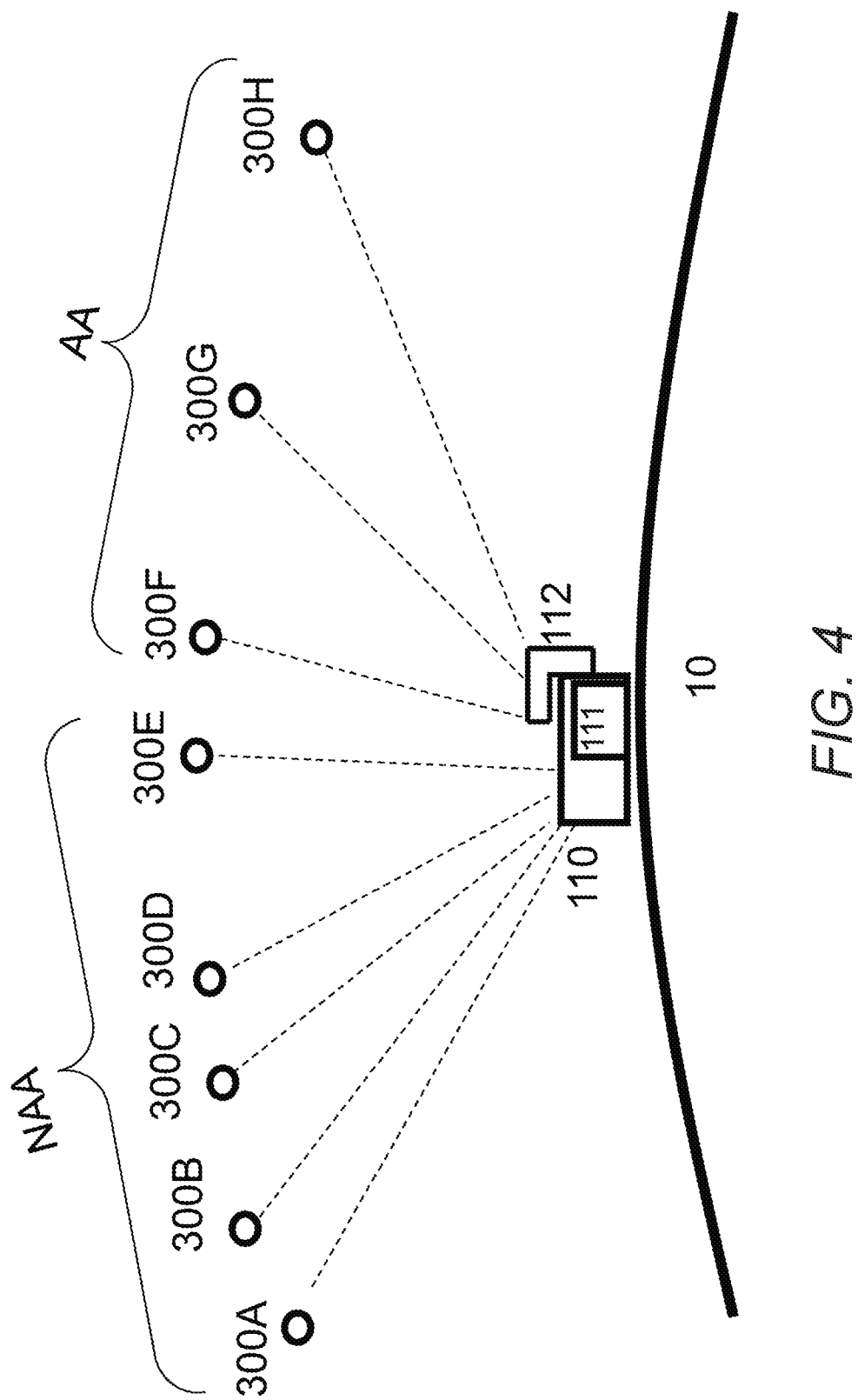
FIG. 4 shows the GPS receiver of FIG. 1 positioned close to the earth.

FIG. 4 shows the GPS receiver 111 of FIG. 1 positioned close to the earth 10. The controller 120 is not shown for ease of explanation. Satellites 300A to 300H are within the viewing range of the GPS receiver 111. Since the GPS receiver 111 does not need all satellite signals for an accurate position reading as mentioned above, signals from satellites 300F, 300G, 300H, for example, can be attenuated or completely blocked by covering the antenna of the GPS receiver 111 with an attenuation device 112 and the GPS receiver 111 can still provide sufficient GPS satellite information for accurate positioning.

As a result of the relative position of the GPS receiver 111 and the attenuation device 112, the attenuation device 112 blocks GPS signals from only a particular area of the sky (in this example the area containing satellites 300F, 300G and 300H). Therefore, the signal strength of a particular satellite is heavily influenced depending on the angular position of the satellite with respect to the attenuation device 112. This renders the antenna radiation pattern heavily asymmetric. The satellites whose signals are attenuated or blocked can be referred to as being in the attenuated area AA of the sky, and the rest can be referred to as being non-attenuated area NAA. In FIG. 4, the satellites 300A, 300B, 300C, 300D and 300E are in the non-attenuated area NAA and the satellites 300F, 300G and 300H are in the attenuated area AA.

In this embodiment, the attenuation device 112 comprises a piece of material that covers a portion of the GPS receiver 111 that attenuates the radio waves at the frequencies of the satellite signals. The material could be a conductive material.

Various materials or types of materials could be used for the attenuation device 112. One category includes blocking materials which reflect the EM waves from satellites, and are electrically conducting materials like copper, aluminum, iron, gold etc. Another category includes attenuating materials which partially dissipate EM waves (turn EM waves into heat) which are for instance ferrite, iron pentacarbonyl, electrically isolated carbonyl iron balls of specific dimensions suspended in a two-part epoxy paint, etc. By applying very thin layers of both categories, especially the second category, or by adjusting the particle size in the mentioned balls in the applied paint, certain levels of attenuation can be achieved instead of completely blocking the signals from the satellites.

Therefore, by simply covering a portion of the antenna of the GPS receiver 111 with the attenuation device 112 and by monitoring and determining whether each satellite is positioned above attenuated areas AA or non-attenuated areas NAA, the orientation data of the GPS receiver 111 can be obtained without adding significantly to the BOM (Bill of Materials) of the positioning system.

Hence, the antenna radiation pattern can be made asymmetric by covering only a particular area of the sky so that incoming signals through that area are attenuated or blocked. By rendering the antenna radiation pattern asymmetric, the signal-to-noise ratio of the signals received from some of the satellite is affected without influencing the azimuth or angle data. When the antenna radiation pattern is asymmetric, the strength of signals from one or more particular satellites is influenced depending on the angular position of those satellites with respect to the area of the attenuation or blocking. When the antenna radiation pattern is asymmetric, the signal-to-noise ratio of the signals received from the satellites in attenuated areas AA is affected while the signal-to-noise ratio of the signals received from the satellites in non-attenuated areas NAA is not.

A positioning system using such a GPS receiver can provide location information as well as additional functionality. For example, it is known that position accuracy of conventional GPS systems is limited to a few meters. Hence, two conventional GPS receives within a couple of meters from each other will be determined to have the same location. However, it would be possible to distinguish between a GPS receiver 111 with the attenuation device 112 and a conventional GPS receiver based on the different received GPS signals (i.e. attenuated vs non-attenuated), even if the GPS receiver 111 and the conventional GPS receiver were very close.

Once the antenna pattern is made asymmetric in orientation by the attenuation device 112, the orientation of the GPS receiver 111 may be determined by the controller 120, e.g. via suitable software analysis of the total antenna pattern behavior of the received signal data.

The specific orientation of the GPS receiver 111 does not matter, and only the direction towards which attenuating surfaces attenuate or block satellite signals matters. As discussed for FIGS. 3A, 3B and 2C, without the attenuation device 112, GPS receivers in different orientations will still provide similar readings of the relative strength of the signals and the azimuth and angle of the satellites as long as the same area of the sky is in the viewing range. Therefore, the use of the attenuation device 112 to generate orientation information has advantage of relieving requirement for calibration of the orientation of the GPS receiver 111.

It will be appreciated that a first glance, it might seem counterintuitive, that embodiments of the invention make some signals worse on purpose enabling embodiments of the invention to have more information (e.g. addition positing data or information like orientation and angle).

The attenuation device 112 may be arranged to attenuate GPS satellite signals by blocking GPS satellite signals from GPS satellites located in the first portion of the sky from being received by the GPS receiver. In such embodiments, the attenuation device 112 may be made from a suitable GPS blocking material or from a conductive material. In such embodiments, the attenuation device 112 may comprise a portion of GPS satellite signal attenuating material located between the GPS receiver and the sky.

The attenuation device 112 may be arranged to attenuate GPS satellite signals by reflection. For example, the attenuation device 112 may comprise a portion of GPS satellite signal reflecting material located under the GPS receiver 111.

FIG. 5 shows a positioning system 200 comprising a GPS device 210, and a server 240. The positioning system is able to determine angle information of the GPS device 210 relative to earth's normal and/or orientation information of the GPS device 210 in a horizontal plane.

The GPS device 210 includes a GPS receiver 211 that is arranged to receive GPS satellite signals from a plurality of GPS satellites and an attenuation device 212. The attenuation device 212 is arranged to attenuate GPS satellite signals such that when a particular GPS satellite is located in a particular portion of sky, the GPS satellite signals received by the GPS receiver 211 from that particular GPS satellite are attenuated (i.e. reduced or blocked). The GPS device 210 further includes a communications unit 213.

The server 240 comprises a controller 220, a storage 230, and a communications unit 241. The GPS device 210 and the server 240 can communicate via the communications unit 213 and the communications unit 250. For example, the GPS device 210 and the server 240 may be connected via an appropriate network such as the internet.

The controller 220 is arranged to determine position information of the GPS device 210 based on received GPS information from the GPS device 210.

The storage 230 is arranged to store reference angle information, reference azimuth information, and reference signal strength for the plurality of GPS satellites over time at the location of the GPS receiver 211. The reference angle information, reference azimuth information, and the reference signal strength correspond to GPS satellite signals from the plurality of GPS satellites that are unattenuated by the attenuation device 212 (i.e. as if the attenuation device 212 were not affecting the radiation pattern). In other words, in this embodiment, the storage 230 holds data relating to the expected sky map of satellites at the location of the GPS receiver 211. This data is well known and is available from a number of different sources.

In some embodiments, the storage 230 may store data relating the expected sky map of satellites (e.g. reference angle information, reference azimuth information, and reference signal strength) at a variety of locations of the GPS device 210, with the location of the GPS device 210 being determined by the controller 220 via the received GPS signals (e.g. via GPS triangulation). For example, storage 230 may store data (e.g. suitable formulae) relating to the expected sky map of satellites for all possible locations on Earth for all time.

In other embodiments, the location of the GPS device 210 may be fixed. In such embodiments, then the storage 230 may prestore the reference azimuth information, and reference signal strength for the plurality of GPS satellites over time at the fixed location of the GPS receiver 211.

In FIG. 5, the GPS device 210 and the controller 220 are shown as being part of separate devices, with the controller 220 and the storage 230 being shown as being part of the server 240. However, in other embodiments the GPS device 210 and the controller 220 could be in the same device, and/or the controller 220 and the storage 230 could be in separate devices with suitable communications units being used to connect them.

In this embodiment, the attenuation device 212 comprises a piece of material that covers a portion of the GPS receiver 211 that attenuates the radio waves at the frequencies of the satellite signals. For example, the GPS receiver 211 may be in a housing (not shown), and the attenuation device 212 may be fixed to a portion of the housing.

Assuming that the attenuation device 212 is fixed in position relative to the GPS receiver 211, then portion of the sky that is attenuated by the attenuation device 212 will depend on the angle of the GPS device 210 relative to earth's normal and/or orientation information of the GPS device 210 in a horizontal plane.

By way of example, the controller 220 receives GPS satellite signals from the GPS receiver 211. As discussed above, in this embodiment, the received GPS satellite signals from the GPS receiver 211 include angle information, azimuth information, and signal strength for each of the plurality of GPS satellites.

The controller 220 compares the received signal strength with the reference signal strength for each of the plurality of GPS satellites at the location of the GPS device 210. At a certain point in time, if the received signal strength for a certain GPS satellite is lower than the reference signal strength for that GPS satellite at that point in time, then it is apparent that the GPS satellite in question is in the portion of the sky that is attenuated by the attenuation device 212. Hence, the controller 220 can determine that the first GPS satellite is in the relevant portion of the sky and determine angle information of the GPS device 210 relative to earth's normal and/or orientation information of the GPS device 210 in a horizontal plane using the reference angle information and reference azimuth information.

In other words, the GPS device 210 can obtain tilt information (i.e. angle information of the GPS device 210 relative to earth's normal) without a separate tilt sensor, and/or compass information (i.e. orientation information of the GPS device 210 in a horizontal plane) without a separate compass. For both these uses, the only extra physical requirement compared to a traditional GPS device is the attenuation device 312.

Figure 6B:
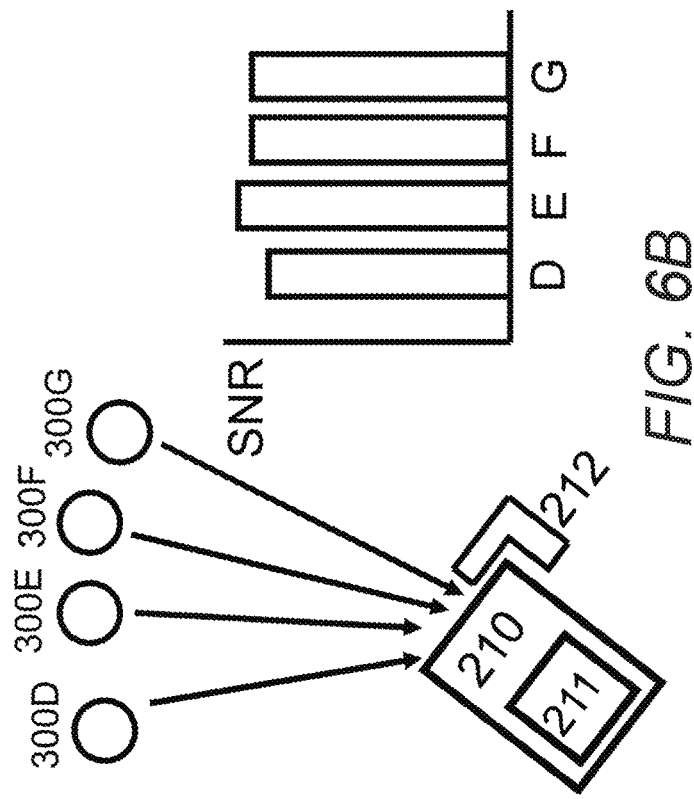
FIGS. 6A and 6B show a GPS receiver according to an exemplary embodiment of the present invention at two different orientations.
Figure 6A:
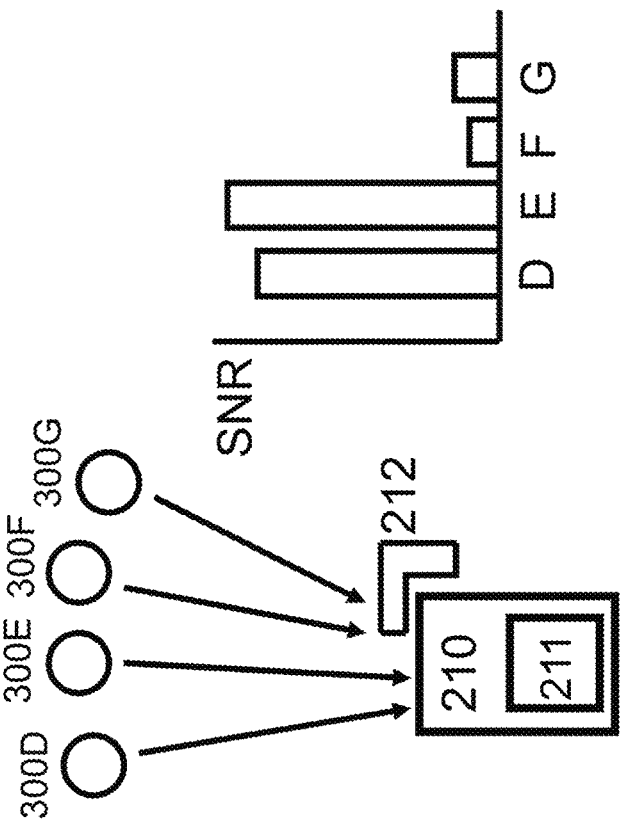

FIGS. 6A and 6A show a GPS device 210 according to an exemplary embodiment of the present invention at two different orientations.

In FIG. 6A, the GPS device 210 is in a first orientation, and the SNR values for four example satellites 300D, 300E, 300F and 300G are shown. It is clear from FIG. 6A, that in this orientation, the attenuation device 212 is blocking the GPS signals for satellites 300F, 300G, but is not blocking satellites 300D, 300E. Hence, the SNR values for satellites 300F, 300G are lower than for satellites 300D, 300E. Furthermore, it would be expected that the SNR values for satellites 300D, 300E correspond to the reference SNR values stored in the storage at the location of the GPS device 210, while the SNR values for satellites 300F, 300G do correspond to the reference SNR values stored in the storage at the location of the GPS device 210.

Hence, the controller 220 can determine the orientation of the GPS device 210 by using the reference angle information and reference azimuth information of the satellites 300F, 300G. Hence, by determining that it is satellites 300F, 300G that are blocked, and knowing how the attenuation device 212 can attenuate the GPS receiver 211 (e.g. because it is in a known fixed in position relative to the GPS receiver 211), the portion of the sky that is attenuated can be determined by the reference angle information and reference azimuth information. Hence, the orientation of the GPS device 210, i.e. the angle information of the GPS device relative to earth's normal and/or orientation information of the GPS device in a horizontal plane can be determined.

Therefore, once the antenna pattern is made asymmetric in orientation by the attenuation device 212, the orientation of the GPS receiver 211 may be determined by the controller 220, e.g. via suitable software analysis of the total antenna pattern behavior of the received signal data. Therefore, by simply covering the antenna of the GPS receiver 211 with the attenuation device 212 and by monitoring and determining whether each satellite is positioned above attenuated areas AA or non-attenuated areas NAA, orientation data of the GPS receiver 211 can be obtained without adding significantly to the BOM (Bill of Materials) of the positioning system.

As discussed in relation to FIGS. 3A, 3B and 3C, without an attenuation device, GPS receivers in different orientations will still provide similar readings of the relative strength of the signals and the azimuth and angle of the satellites as long as the same area of the sky is in the viewing range. Therefore, the use of the attenuation device 212 to generate orientation information has advantage of relieving requirement for calibration of the orientation of the GPS receiver 211.

In some embodiments, the controller 220 can determine a change in the angle of the GPS device 210 relative to earth's normal and/or a change in the orientation of the GPS device 210 in a horizontal plane based on change in the received GPS signals. This will be explained in relation to FIG. 6B.

In FIG. 6B, the GPS device 210 is in a second orientation, and the SNR values for four example satellites 300D, 300E, 300F and 300G are shown. It is clear from FIG. 6B, that in this orientation, the attenuation device 212 is not blocking the GPS signals from any of satellites 300D, 300E, 300F, and 300G. Hence, if the received GPS signals change from the SNR values of FIG. 6A (first orientation) to the SNR values of FIG. 6B (second orientation), the controller 220 can easily determine that there has been a change in the angle of the GPS device 210 relative to earth's normal and/or a change in the orientation of the GPS device in a horizontal plane.

In other embodiments, the location of the GPS device 210 may be fixed, and the storage 230 may build up the reference angle information, reference azimuth information, and reference signal strength for the plurality of GPS satellites over time at the location of the GPS receiver 211. In other words, the storage 230 does not need any prestored information. In such embodiments, the controller 220 may determine a change in the angle of the GPS device relative to earth's normal and/or a change in the orientation of the GPS device in a horizontal plane based on change in the determined angle information and/or orientation information over time.

Some embodiments can determine a determine a change in orientation of the GPS device without using reference angle information, reference azimuth information, and reference signal strength for the plurality of GPS satellites over time at the location of the GPS receiver. In other words, in such embodiments, it is not required to store the reference angle information, reference azimuth information, and reference signal strength for the plurality of GPS satellites over time.

For example, referring back to FIG. 1, the controller 120 may be arranged to determine a time of day when received GPS satellite signals from a particular GPS satellite become attenuated as a result of said GPS satellite passing through the portion of the sky that is attenuated by the attenuation device. For example, the controller 120 may monitor SNR values for the GPS satellites and store the time of day in which a particular satellite has a large drop in SNR values (i.e. when it passes from NAA to AA as mentioned above in relation to FIG. 4). A change in the time of day in which a particular satellite has a large drop in SNR value indicates a change in tilt or compass orientation of the GPS device. Hence, a change in tilt or compass orientation of the GPS device can be determined in this way.

More generally, it will be appreciated that to determine if there has been a change in tilt or compass orientation, the GPS device need not determine the actual compass angle or tilt of the GPS device. For example, if the GPS device is in one location, the controller could just compare one set of GPS signals with another (e.g. either close in time or at the same time the next day) to determine if there has been such a change. Hence, such a GPS device can provide the functionality of a tilt sensor without the need for a conventional tilt sensor.

In addition, if the positioning system comprises two or more GPS receivers that can communicate with each other (or with a shared controller), no information is required from a database of live connection to find orientation because instead of using information from the database or live link, data from GPS receivers can be compared. If, for instance, two GPS receivers have the same reading but the first GPS receiver has for one satellite a much lower signal strength or the satellite is not received at all, we can determine the azimuth and angle/orientation from this reading, assuming it is known what part of the sky we intentionally blocked/attenuated.

As discussed, some embodiments can determine the actual tilt and/or compass orientation of the GPS device without pre-stored GPS information. Such an embodiment will be explained in relation to FIGS. 7A and 7B.

Figure 7B:
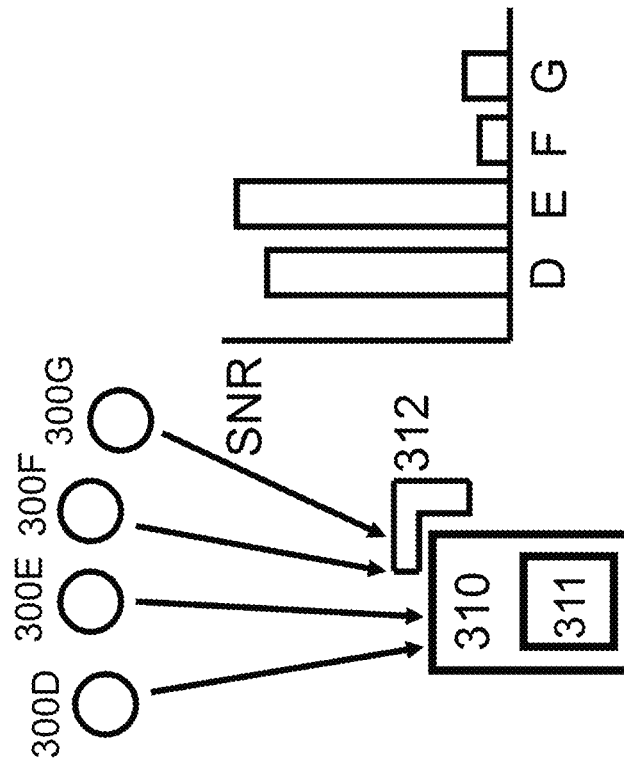
FIGS. 7A and 7B show a GPS receiver according to an exemplary embodiment of the present invention at two different attenuation states.
Figure 7A:
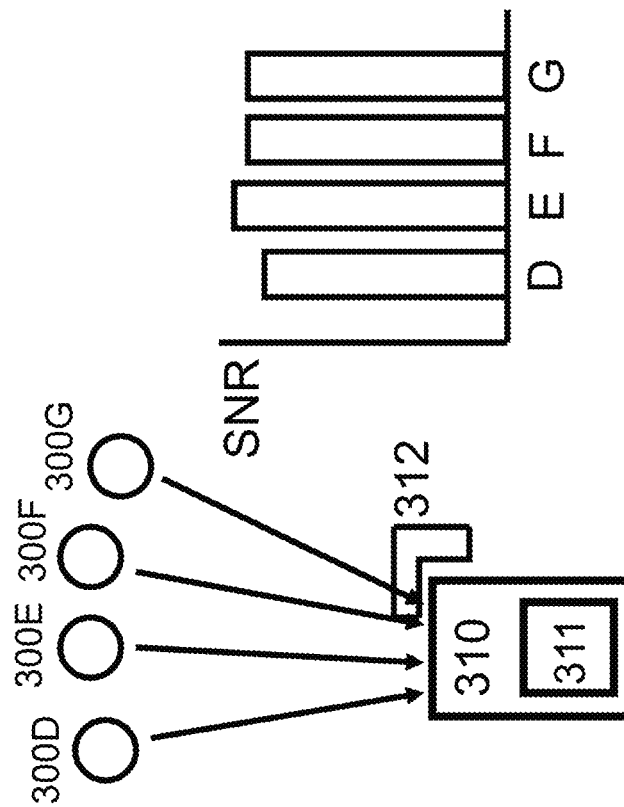

FIGS. 7A and 7A show a GPS device 310 according to an exemplary embodiment of the present invention at two different attenuation states. FIGS. 7A and 7B show a GPS device 310 that includes a GPS receiver 311 and an attenuation device 312. A controller is not shown, but could either be part of the GPS device 310 or remote from it. FIGS. 7A and 7B show SNR values from four example satellites 300D, 300E, 300F and 300G. In this embodiment, the attenuation device 312 comprises a piece of material that covers a portion of the GPS receiver 311 that attenuates the radio waves at the frequencies of the satellite signals.

As will be explained in more detail below, the attenuation device 312 of this embodiment is capable of altering is attenuation to have a first state in which the attenuation device 312 does not attenuate GPS satellite signals, and a second state in which the attenuation device 312 attenuates GPS satellite signals such that when a particular GPS satellite is located in a particular portion of sky the GPS satellite signals received by the GPS receiver 211 from that particular GPS satellite are attenuated (i.e. reduced or blocked).

FIG. 7A shows the attenuation device 312 in the first state (no attenuation). Hence the SNR values for the four example satellites 300D, 300E, 300F and 300G are all high. FIG. 7B shows the attenuation device 312 in the second state (attenuation). It is clear from FIG. 7B, that in this state, the attenuation device 312 is blocking the GPS signals for satellites 300F, 300G, but is not blocking satellites 300D, 300E. Hence, the SNR values for satellites 300F, 300G are lower than for satellites 300D, 300E.

The GPS device 310 can determine its orientation quickly and easily by switching the state of the attenuation device 312 from the first state (no attenuation) to the second state (attenuation). This can be done by observing the GPS signals in the first state (i.e. angle information, azimuth information, and signal strength for each of the plurality of GPS satellites), and then observing the change in the second state. In other words, the GPS device 310 can determine the actual tilt and/or compass orientation of the GPS device 310 without pre-stored GPS information.

The tilt and/or compass orientation of the GPS device 310 can be determined by considering the angle information and azimuth information of the "missing" GPS satellites (i.e. lower than expected SNR values) in the second state.

The switching from the first state to the second state can be done quickly. For example, the GPS device 310 could take a first reading of GPS signals in the first state and then immediately take a second reading of GPS signals in the second state. As for other embodiments of the invention, this method of determining orientation of the GPS device 310 does not require any pre-calibration steps.

It is well understood that magnetic compasses can be used to provide orientation data in a large number of conventional scenarios. Many mobile devices (e.g. tablets, smart phones), use compasses that comprise magnetic sensors such as a Hall sensor, Anisotropic Magnetoresistive (AMR) or Giant Magnetoresistive (GMR) sensors. It is well know that these types of sensors have a magnetic sensor that alters its resistance proportional to the magnetic field in a particular direction. Circuitry on the sensor chip detects the magnetic field strength and makes the field and its direction available as digital data. The CPU on the mobile device pulls this data whenever compass data is required. However, it is also well know that such conventional sensors acting as a compass in a mobile device require calibration. Such calibration often requires the user to perform a figure of eight motion.

By using a GPS device 310 as discussed above to determine compass orientation, no calibration is required. Hence, a mobile device having such a GPS device 310 need not have a separate compass sensor. This may reduce the BOM for the mobile device. Alternatively, such a GPS device 310 may be used to provide initial orientation data to quicken or eliminate the calibration steps for a traditional compass sensor.

While a compass may still be needed for indoor use or for locations where there are no GPS signals, such embodiments can help by making the readout faster. In addition, in the case that there is a magnetic disturbance in the area of magnetic objects (where compass does not work reliably, which the user/device cannot know), such embodiments provide an alternative compass mechanism.

In other words, a mobile device (e.g. a smartphone, tablet or otherwise) can be provided with a positioning system according to embodiments of the invention in order to provide tilt and/or compass information. The tilt and/or compass information could be provided in addition to location information. Hence, such a positioning system can provide extra functionality with little extra cost.

In addition, in such embodiments, the positioning system can provide a check regarding the correct working of the compass or can provide the calibration procedure which makes it easier for the user (e.g. the user does not need to walk a big 8 pattern to calibrate the compass).

Furthermore, such a GPS device 310 as discussed above to determine orientation can be used in place of a traditional compass (i.e. one using a magnetized needle) in areas of high magnetic fields.

In other words, using a GPS device 310 as discussed above to determine orientation can avoid many or the issues with traditional compasses, with the only extra physical requirement compared to a traditional GPS device being the attenuation device 312.

The attenuation device 312 having a first state (no attenuation) and a second state (attenuation) can be implemented in various ways. For example, it is well understood that waveguides are associated with a cut-off frequency Fc, which is the operating frequency below which attenuation occurs and above which propagation lakes place. This means a waveguide can pass frequencies which relate to the size of the waveguide. The same principle hold for gauzes or wire meshes.

Figure 8A:
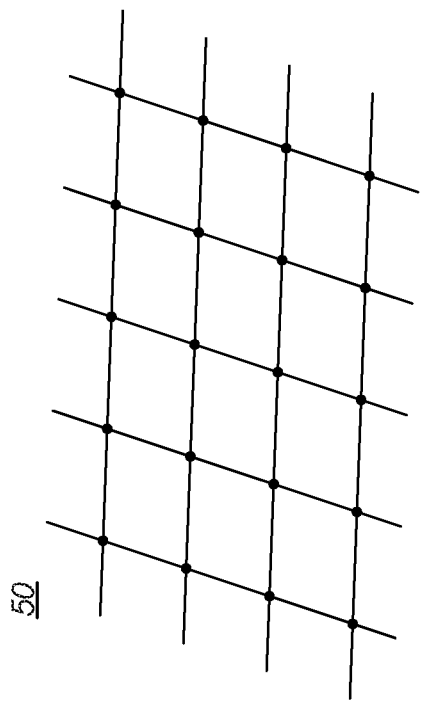
FIGS. 8A and 8B illustrate a cut-off frequency associated with a waveguide.
Figure 8B:
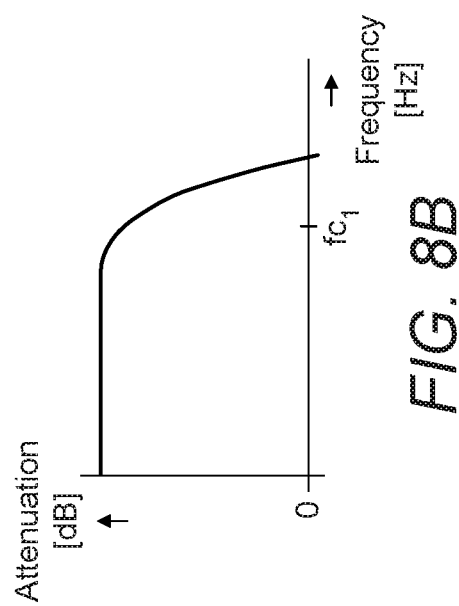

Referring to FIGS. 8A and 8B, if a gauze 50 is placed between a GPS receiver and the sky, preferable as close as possible to the GPS antenna, and if the size of the gauze is big enough, GPS frequency will pass through the gauze 50, having a negligible effect on the reception of the satellite signals going to the GPS receiver.

Figure 9A:
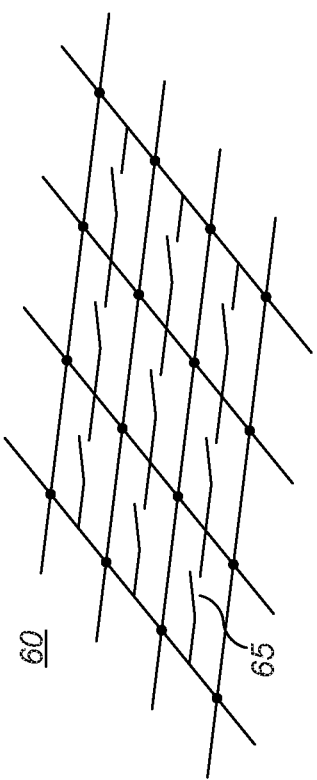
FIGS. 9A and 9B illustrate a cut-off frequency associated with a switchable waveguide.
Figure 9B:
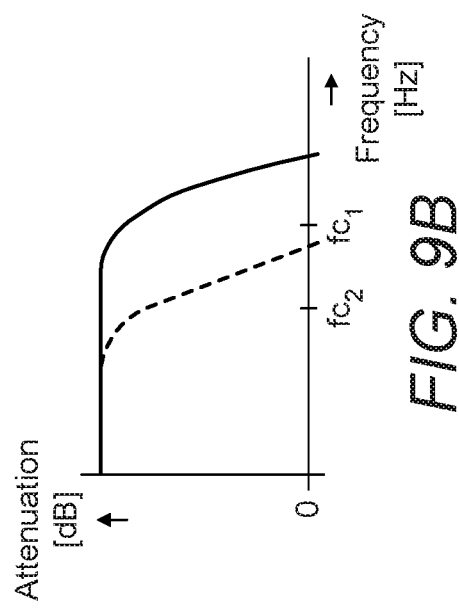

Referring to FIGS. 9A and 9B, the cut-off frequency Fc of a gauze 60 can be altered by making the gauze size smaller. This can be done by adding switching elements 65 with small wires as depicted in FIG. 9A. Hence, the gauze size can be smaller electronically, resulting in a changed Fc (from $Fc_1$ to $Fc_2$ as shown in FIG. 9B). Therefore, GPS signals can be attenuated if the appropriate gauze is chosen.

It is known to use diodes (putting them in conducting mode) to switch between antennas of Wi-Fi chipsets like 802.11a and 802.11b/g resp. 2.4 and 5.2 GHz. An electronically switchable gauze 70 is shown in FIG. 10.

Figure 10:
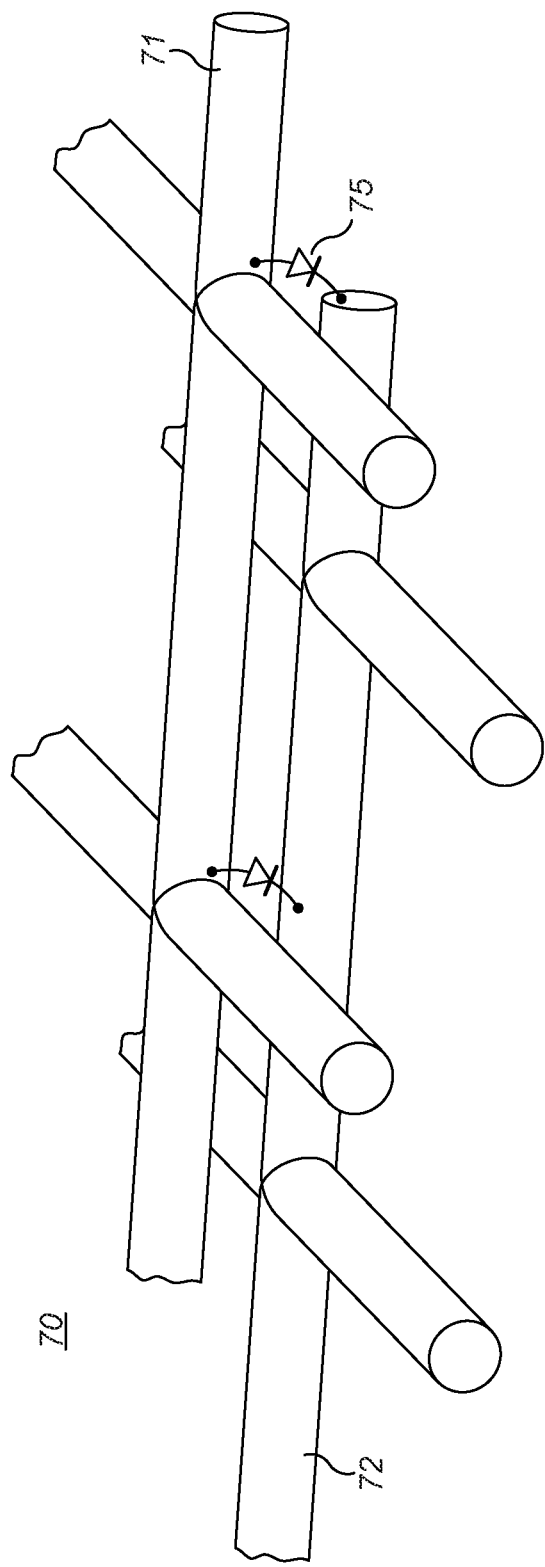
FIG. 10 illustrates a switchable gauze.

As shown in FIG. 10, many diodes are used that are put in conducting mode. In this example two gauzes 71, 72 are placed close together and on top of each other to form the electronically switchable gauze 70. Between the two gauzes 71, 72, RF switch diodes 75 are connected. When not conducting the diodes 75 have little effect but when a DC voltage is applied between the gauzes 71, 72 the diodes 75 create a short-circuit between the two gauzes 71, 72 resulting in a change in Fc. The gauzes 71, 72 could be made from any conducting material (e.g. copper, aluminum, gold etc.).

By applying one or more sections of switchable gauze 70 to GPS device 310 (e.g. on a portion of the housing) it is possible to switch on and switch off a part of the sky concerning GPS signals, hence realizing an attenuation device 312 having a first state (no attenuation) and a second state (attenuation).

Other elements/materials resulting in GPS frequency range RF switching are also usable. For instance material which can realize a RF-conducting state in the GPS frequency range based on temperature, pressure or ultrasonic signals should not be excluded. This includes creating contacts or shortcuts between points based on locally heating up material (pieces touch because conducting material expand or contract).

Embodiments of the invention can be used in an outdoor lighting system. An outdoor lighting system employing a positioning system such as those discussed above will now be described in relation to FIGS. 11A and 11B. In general terms, the roadmap for outdoor street lighting is towards GPS based Mesh network and/or GPRS/3G/4G enabled fixtures that are equipped with a GPS receiver.

Figure 11A:
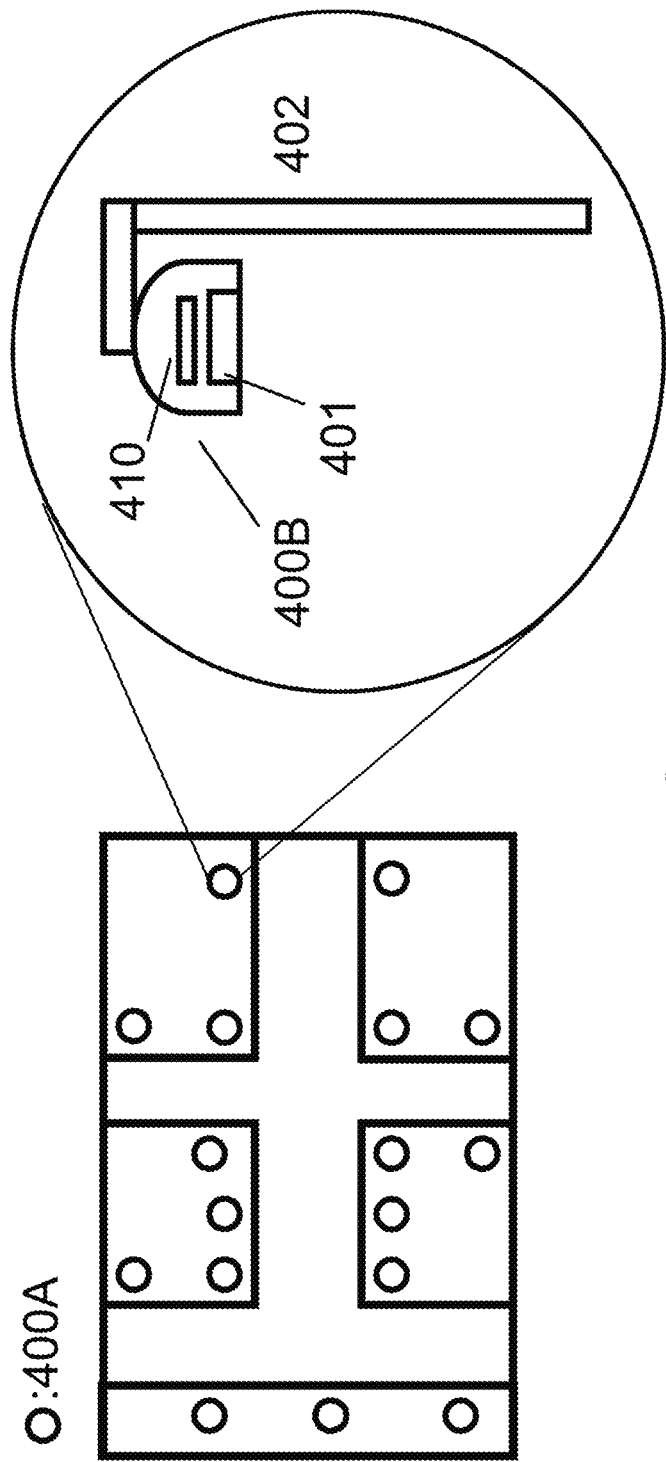
FIGS. 11A and 11B illustrate an outdoor lighting system according to an embodiment of the invention.

As shown in FIG. 11A, the outdoor lighting system comprises a number of outdoor lighting apparatuses 400A (shown as circles). Each outdoor lighting apparatus 400A comprises a lighting unit 400B that includes a GPS device 410 and one or more lights 401. Furthermore, each outdoor lighting apparatus 400A comprises a pole 402 on which the lighting unit 400B is mounted.

Figure 11B:
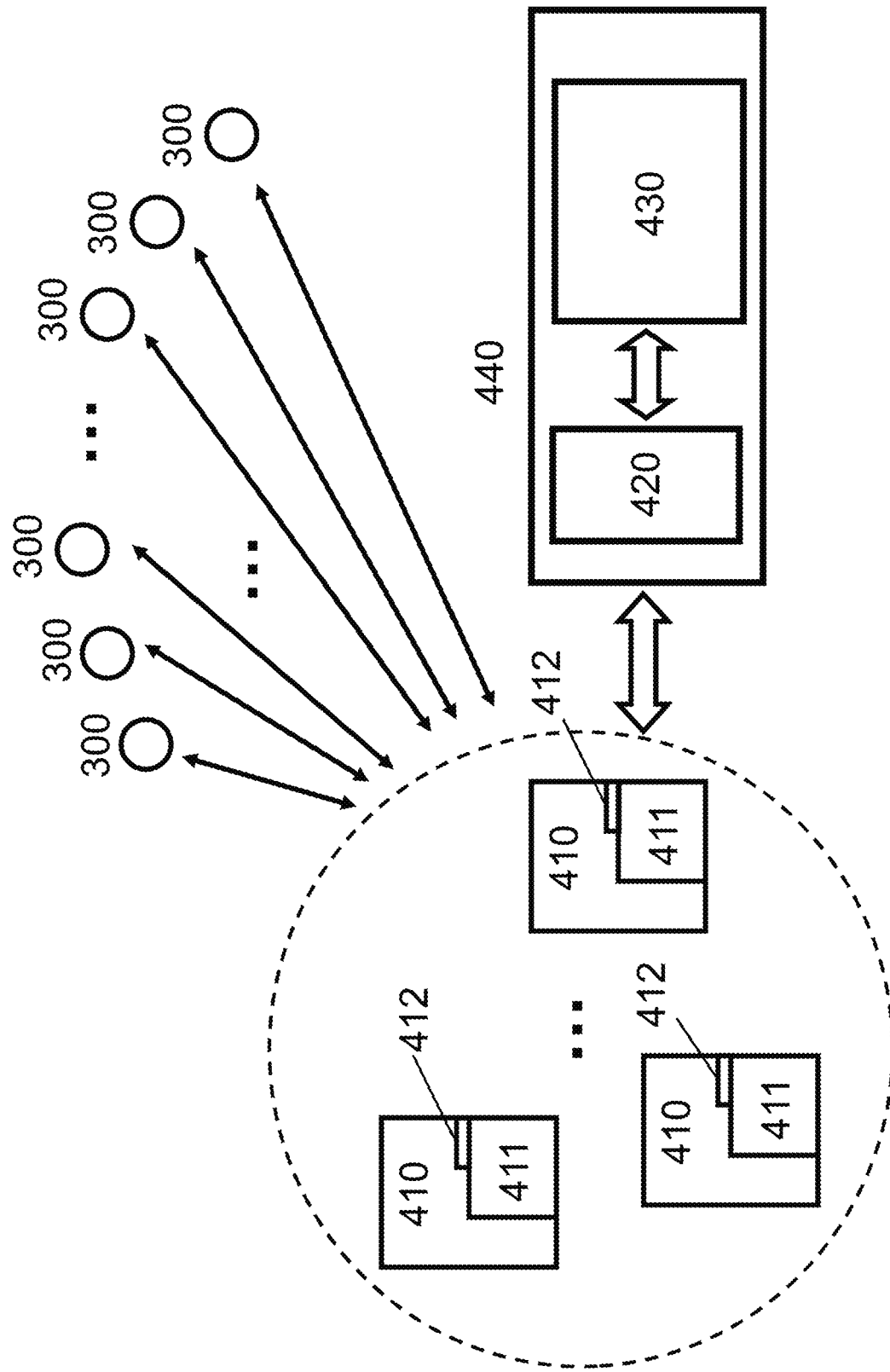

As shown in FIG. 11B, each GPS device 410 has a GPS receiver 411 and an attenuation device 412. Each GPS device 410 is connected to a server 440 that comprises a controller 420 and a storage 430. The GPS devices 410 and the server 440 can communicate via an appropriate network such as the internet, e.g. via GPRS/3G/4G.

The antenna of the GPS receiver 411 can be fixed to maintain the initial relative position to the housing (not shown) of the GSP receiver 410 in the manufacturing process. As discussed below, the orientation of the GPS receiver 410 can provide information regarding the orientation of the outdoor lighting apparatuses 400A if the housing can be arranged to be always in the same position in the fixture, e.g. by fixing it with a socket based on the NEMA 3 pin (ANSI C136.10). Alternatively, any sockets or fitting connections which can only be positioned in one way may be used instead of the socket based on the NEMA 3 pin.

As shown in FIG. 11B, the server 440 communicates with multiple GPS devices 410 via the internet. Each GPS device 410 comprises a RFIC (Radio Frequency Integrated Circuit) front end and a baseband processor, as is standard in the industry. The RFIC front end receives, demodulates and amplifies the L-band radio signal received from the multiplicity of satellites. The baseband processor, a microprocessor installed within the GPS receiver 411, computes 3-dimensional position and velocity of the receiver and time, based on the signals broadcast by the satellites. The baseband processor stores map files of local area in the memory. The data is transmitted to the server 440 which can be a PC or a mobile device using the NMEA protocol, the standard format of GPS data. A communication unit (not shown) of the server 440 receives and stores the signal data and transmits it to a controller 420 of the server 440.

It will be appreciated that the baseband processor may be located outside the GPS receiver 411 but near the RFIC front-end within the street lighting unit. The baseband processor may be located directly at the server 420 to take advantage of more powerful processing that that of a microprocessor. The GPS receiver 411 may also connect to the server 420 which can hold more detailed maps instead of storing map files in the memory of the baseband processor.

When the outdoor lighting apparatuses 400A are installed, they may be installed in no particular order. Once installed, the GPS location of the outdoor lighting apparatus 400A may be used to identify it—as it can be assumed that the outdoor lighting apparatus 400A once installed is fixed. In other words, GPS location enables the server 440 to identify a particular outdoor lighting apparatus 400A among the plurality of the outdoor lighting apparatuses 400A.

Hence, by integrating the GPS device 410 into the outdoor lighting apparatus 400A, location specific information of multiple street outdoor lighting apparatuses 400A can be monitored and managed in real time from a remote location at the server 440. Each street outdoor lighting apparatus 400A may be uniquely identified in location. Real-time and remote monitoring may improve flexibility and visibility over individual lighting units, efficiency of energy use and level of maintenance. Performance history can be stored, analyzed, and visualized on the remote server 440. Such monitoring system can be integrated with other systems in a building or a city via public mobile communications network. For example, one central system of a city can have full control over decision on its lighting and dimming levels, setting schedules, analytics, energy consumption, and whether to repair a specific outdoor lighting apparatus 400A.

In general terms, it is of interest to monitor whether a particular outdoor lighting apparatus is structurally damaged. This often happens because a vehicle can knock over a pole on which the lighting unit is mounted. It is also be of interest if multiple lighting unit, each equipped with its own GPS receiver, can be installed on a single pole or close to each other within a couple of meters but monitored separately. These tasks require the position accuracy of 0.5 meters or better, along with prolonged measurement and statistical analysis. However, as mentioned above, position accuracy of conventional GPS receivers is limited to a few meters, and a solution using conventional GPS receivers is not currently present. At the expense of increased BOM (Bill of Materials) of each lighting unit, these tasks can be conventionally performed by appending extra conventional hardware to the conventional GPS receivers. The angle of the pole could be monitored with a tilt sensor or an electronic compass. However, in addition to the increased cost, an electronic compass can be very unreliable and requires in most cases a calibration procedure.

As will be appreciated, by using a positioning system including a GPS device 410 including an attenuation device 412 arranged to attenuate GPS satellite signals can provide a number of important benefits. For one, the GPS device 410 including an attenuation device 412 can be used as a tilt/orientation sensor without any extra material.

Also, it is possible for the server 440 to determine based on difference in attenuated GPS signals between two GPS devices 410 on the same pole. For example, one pole 402 could have mounted thereon two outdoor lighting apparatuses 400A, each with a GPS device 410 with an attenuation device 412. Assuming the attenuation devices 412 of the two outdoor lighting apparatuses 400A were not identically arranged (if for example the attenuation devices 412 comprised a piece of conductive material placed over the GPS receiver 411 at a random orientation), then the two outdoor lighting apparatuses 400A could be distinguished at the server 420 (and therefore be identified) based on the difference in received GPS signals. The actual orientation of the attenuation devices 412 would not matter in this instance, as the server 420 would only need to tell one GPS receiver 411 from another.

Alternatively, if two outdoor lighting apparatuses were placed on the same pole, then one could have a GPS device 410 with an attenuation device 412 and the other could have a conventional GPS device (with no attenuation device). Again, the two outdoor lighting apparatuses could be distinguished at the server 420 (and therefore be identified) based on the difference in received GPS signal.

In such embodiments, the location of a first outdoor light apparatus 400A may be distinguished from the location of a second outdoor light apparatus 400A on the basis of a difference in received GPS signals from the first outdoor light apparatus 400A and the second outdoor light apparatus 400A. For example, a difference in SNR for a particular satellite measured at the second outdoor light apparatus when compared to the first outdoor light apparatus 400A would enable the GPS signals from the first outdoor light apparatus 400A to be differentiated from the second outdoor light apparatus 400A. Hence, the first outdoor light apparatus 400A and the second outdoor light apparatus 400A could be individually identified by the controller 420, even if their GPS receivers 411 were close enough that a conventional GPS location reading would give the same result. In other words, such embodiments enable a controller to identify two outdoor light apparatuses on the same pole using only the GPS receivers 411.

Hence, embodiments of the invention help to accurately determine the position and orientation of luminaires on a pole, especially when the pole comprises multiple luminaires (e.g. one oriented for street lighting and another for bicycle or footpad lighting). In contrast, conventional GPS receivers embedded in the luminaire do not allow distinguishing between the two.

It will be appreciated that a first glance, it might seem strange and counter-logical, while the whole world is in battle to get the best reception from satellite signals, that embodiments of the invention make some signals worse on purpose enabling embodiments of the invention to have more information like orientation and angle.

However, by using an attenuation device, the sky may be made unique for every angle and/or rotation of the outdoor lighting apparatus 400A. For example, if the housing can be arranged to be always in the same position in the outdoor lighting apparatus 400A, e.g. by fixing it with a socket based on the NEMA 3 pin, then GPS receiver 410 is always in the same position with respect to the socket in the outdoor lighting apparatus 400A, and change over time in the "sky map" (see FIGS. 2A-D) can be used to determine angle and orientation.

The antenna may be covered with material which attenuates incoming signals under a certain angle. It is also possible to completely block signals under a certain angle by applying small pieces of metal instead of attenuating material. This can be done in the manufacturing process of the outdoor lighting apparatuses 400A (in case the GPS receiver is inside the outdoor lighting apparatus 400A) or in the cabinet attached to the fixture of the outdoor lighting apparatus 400A.

It will be appreciated that there may already be some asymmetry in the radiation pattern due to surrounding buildings etc. This may be taken into account when building a model for determining the position of the GPS receiver 410. In this way, it is possible to store a kind of sky-map of the sky based on objects (e.g. buildings, trees) for every outdoor lighting apparatus 400A. A change in this map would reveal a change in the angle of the outdoor lighting apparatus 400A, depending on how these changes are caused. A new building covering a certain area of the sky for this particular GPS receiver is another change in reception compared to the fixture being under an angle causing the whole sky-map to shift. It will be appreciated that it is possible to create a complete height-map of a city where multiple (light) points contribute in the measurement. So from many points in a city, it is possible to create a sky-line. Combining all these skylines can be used to create a height-map of the complete city.

Furthermore, it will be appreciated that information on the location, size and height of buildings in a city are known and available. This information (along with satellite information) can be used to provide to determine a sky-map for that portion. Hence, if the positioning system has information on such a sky-map (which means knowledge about position, size and height of buildings or trees or any object blocking GPS signals), the positioning system can not only detect change in the sky-line seen from every GPS receiver but also detect a wrong mounting of hanging fixture (e.g. an outdoor lighting apparatus), or the absolute azimuth and angle of a fixture from day one after installation, so within approximately half an hour.

This can be done by the positioning system comparing the (calculated) and known sky-map as seen from the fixture with the measured sky-map. The "measured sky-map" in this case refers to the sky-map determined using received satellite signals. Hence, the positioning system can detect which satellite signals disappear and become visible due to the blocking/attenuation of buildings/trees etc. in its surroundings. If the known sky line can be mapped within a certain percentage of coverage after rotation and tilting, then the positioning system can determine the azimuth and angle of that particular fixture. It the position of the fixture is not known within a couple of meters but more, calculations can be made trying to map this measured and known sky-map from a couple of locations in that surrounding.

As disused above, embodiments of the present invention can provide a computer-implemented method of positioning system comprising: using a GPS device including a GPS receiver to receive GPS satellite signals from a plurality of GPS satellites, and using an attenuation device to attenuate GPS satellite signals such that when a GPS satellite is located in a first portion of sky the GPS satellite signals received by the GPS receiver from said GPS satellite are attenuated; and determining position information of the GPS device based on received GPS information from the GPS device.

Embodiments of the present invention can also provide a computer readable medium carrying computer readable code for controlling a computer to carry out the method of any one of the above aspects.

Embodiments of the invention can provide a positioning system comprising: a GPS device including a GPS receiver arranged to receive GPS satellite signals from a plurality of GPS satellites and an attenuation device arranged to attenuate GPS satellite signals such that when a GPS satellite is located in a first portion of sky the GPS satellite signals received by the GPS receiver from said GPS satellite are attenuated; a storage arranged to store satellite location information for the plurality of GPS satellites over time at a location of the GPS receiver; and a controller arranged to determine location information of the GPS device based on received GPS information from the GPS device, wherein the received GPS information comprises information on signal strengths of the GPS satellite signals received by the GPS receiver, wherein if a signal strength for a first GPS satellite is lower than a threshold signal strength at a point in time then the controller is arranged to determine that the first GPS satellite is in the first portion of the sky and determine angle information of the GPS device relative to earth's normal and/or orientation information of the GPS device in a horizontal plane using the stored satellite location information. It will be appreciated that the components of the positioning system could, as discussed above, be either part of a single apparatus or as part of two or more apparatuses in communication.

The above embodiments as described are only illustrative, and not intended to limit the technique approaches of the present invention. Although the present invention is described in detail referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:
1. A positioning system comprising:
a GPS device including a GPS receiver arranged to receive GPS satellite signals from a plurality of GPS satellites and an attenuation device arranged to attenu- ate first GPS satellite signals received from a first GPS satellite located in a first portion of sky;

a storage arranged to store satellite location information for the plurality of GPS satellites over time at a location of the GPS receiver; and a controller arranged to determine location information of the GPS device based on received GPS information from the GPS device, wherein the received GPS information comprises information on signal strengths of the GPS satellite signals received by the GPS receiver from the plurality of GPS satellites, wherein the controller is arranged to determine that the first GPS satellite is in the first portion of the sky in response to determining that a signal strength of the attenuated first GPS satellite signals from the first GPS satellite is lower than a threshold signal strength at a point in time, and wherein the controller is arranged to determine angle information of the GPS device relative to earth's normal and/or orientation information of the GPS device in a horizontal plane from the attenuated first GPS satellite signals using the stored satellite location information.

2. The positioning system according to claim 1, wherein the attenuation device comprises a portion of GPS satellite signal attenuating material located between the GPS receiver and the sky.

3. The positioning system according to any claim 1, wherein the attenuation device comprises a portion of GPS satellite signal reflecting material located under the GPS receiver.

4. The positioning system according to claim 1, wherein the attenuation device is fixed in position relative to the GPS receiver.

5. The positioning system according to claim 4, wherein the satellite location information comprises reference angle information, reference azimuth information, and reference signal strength for the plurality of GPS satellites, which includes said first GPS satellite, over time at the location of the GPS receiver, wherein the reference angle information, the reference azimuth information, and the reference signal strength correspond to GPS satellite signals from the plurality of GPS satellites unattenuated by the attenuation device;

wherein the controller is arranged to receive angle information, azimuth information, and corresponding signal strength for each of the plurality of GPS satellites from the GPS receiver;

wherein the controller is arranged to compare the received corresponding signal strength with the reference signal strength for each of the plurality of GPS satellites; and wherein, in response to determining that the signal strength of the attenuated first GPS satellite signals is lower than the reference signal strength for the first GPS satellite, the controller is arranged to determine that the first GPS satellite is in the first portion of the sky and determine the angle information of the GPS device relative to earth's normal and/or the orientation information of the GPS device in the horizontal plane using the reference angle information and the reference azimuth information.

6. The positioning system according to claim 1, wherein the controller is arranged to determine a change in the angle of the GPS device relative to earth's normal and/or a change in the orientation of the GPS device in the horizontal plane based on change in the determined angle information and/or orientation information.

7. The positioning system according to claim 1;

wherein the controller is arranged to determine a time of day when received GPS satellite signals from a given GPS satellite become attenuated as a result of said given GPS satellite passing through the first portion of the sky;

wherein the controller is arranged to determine a change in orientation of the GPS device based on a change in the time of day when the received GPS satellite signals from said given GPS satellite become attenuated.

8. The positioning system according to claim 1, wherein the attenuation device has a first state in which the attenuation device does not attenuate GPS satellite signals, and a second state in which the attenuation device attenuates GPS satellite signals from the first portion of the sky.

9. The positioning system according to claim 8, wherein the attenuation device comprises a first gauze, a second gauze on top of the first gauze, wherein the first gauze and the second gauze are not electrically connected in the first state, and wherein the first gauze and the second gauze are electrically connect the first gauze and the second gauze in the second state.

10. The positioning system according to claim 9, wherein the attenuation device comprises at least one switch diode connected between the first gauze and the second gauze, wherein the at least one switch diode is arranged to electrically connect the first gauze and the second gauze in the second state.

11. A mobile device comprising:
the positioning system according to claim 1.

12. An outdoor lighting system comprising:
the positioning system according to claim 1;
an outdoor lighting apparatus comprising a lighting unit including the GPS device and one or more lights;
wherein the controller is arranged to determine location information of the lighting unit based on the received GPS information from the GPS device.

13. The outdoor lighting system according to claim 12, wherein the outdoor lighting apparatus further comprises:
a second lighting unit including a second GPS device and one or more second lights;
wherein the second GPS device includes a second GPS receiver arranged to receive GPS satellite signals from the plurality of GPS satellites;
wherein the controller is arranged to determine location information of the second lighting unit based on received GPS information from the second GPS device.

14. The outdoor lighting system according to claim 13, wherein the second GPS device further includes a second attenuation device arranged to attenuate second GPS satellite signals such that when a second GPS satellite is located in a second portion of the sky the second GPS satellite signals received by the second GPS receiver from said second GPS satellite are attenuated.

15. The positioning system according to claim 1, wherein the attenuation device is arranged to attenuate the first GPS satellite signals by blocking the first GPS satellite signals from the first portion of the sky from being received by the GPS receiver.

* * * * *